US005888617A

United States Patent [19]
Roth

[11] Patent Number: 5,888,617
[45] Date of Patent: Mar. 30, 1999

[54] OBJECT WITH MATTED SURFACE AND POLYMERIZATION METHOD FOR THE PRODUCTION OF THE MATTING

[75] Inventor: Angelika Roth, Frankfurt, Germany

[73] Assignee: Heraeus Noblelight GmbH, Hanau, Germany

[21] Appl. No.: 713,180

[22] Filed: Sep. 12, 1996

[30] Foreign Application Priority Data

Feb. 26, 1996 [DE] Germany ........................ 196 06 962.9

[51] Int. Cl.[6] .................................. C08F 2/48; C08F 2/54

[52] U.S. Cl. .......................... 428/152; 427/493; 427/494; 427/496; 427/508; 522/4

[58] Field of Search ................................ 522/4; 428/141, 428/152, 413, 500; 427/494, 493, 496, 508

[56] References Cited

U.S. PATENT DOCUMENTS

| | | | |
|---|---|---|---|
| 4,313,969 | 2/1982 | Matthews et al. | 427/44 |
| 4,421,784 | 12/1983 | Troue | 427/54.1 |
| 5,585,415 | 12/1996 | Gorzalski et al. | 522/18 |

OTHER PUBLICATIONS

Diehl et al., "UV–Curing with a New Monochromatic UV–Lamp Generation," RadTech Europe 1995, Conference Proceedings, Sep. 25–27, 1995, pp. 48–52.

*Primary Examiner*—Marion McCamish
*Assistant Examiner*—Cheryl Juska
*Attorney, Agent, or Firm*—Oblon, Spivak, McClelland, Maier & Neustadt, P.C.

[57] ABSTRACT

An object with a homogeneous matted surface is provided which can be carried out in a simple manner and at low cost. The surface of the object has a thin skin layer produced by UV polymerization at a wavelength of at most 200 nm, and a core or carrier layer, beneath the skin layer, is produced by polymerization with UV radiation of a wavelength of at least 220 nm or by electron beams. A method for producing the matted surface is also provided, wherein a film made of an organic material that can be polymerized by UV radiation or electron beams is applied to a substrate; the film is irradiated with UV radiation of a wavelength of at most 200 nm, with the production of the skin layer at the surface, in which the organic material is at least partially polymerized; and the core area of the film, beneath the skin layer, is irradiated with UV radiation having a wavelength above 220 nm or by electron beams.

10 Claims, 1 Drawing Sheet

OBJECT WITH MATTED SURFACE AND POLYMERIZATION METHOD FOR THE PRODUCTION OF THE MATTING

BACKGROUND OF THE INVENTION

1. Field of the Invention

The invention concerns an object with a matted surface, with a substrate on which a plastic layer, made of a polymerized organic material with a structured surface that appears optically mat, is applied. Furthermore, the invention concerns a polymerization method for the production of a matted surface on a substrate.

2. Discussion of the Background

A method is known for producing matted surfaces on objects such as paper, wood, or plastic sheetings, by providing the substrate material with a matting lacquer that can be cured by UV light or by means of electron beams. Such matting lacquers contain matting agents that serve to produce the matting. $SiO_2$ particles dispersed in the lacquer are common as matting agents.

The matted surface of the objects is produced in the known polymerization methods by applying a film of the lacquer on a substrate and subsequently polymerizing by radiation with a wavelength in the ultraviolet range or by electron beams. Upon curing the lacquer film, the dispersed matting agents produce a slight unevenness of the free surface, which therefore appears optically mat.

The matting agents dispersed in the lacquer reflect the UV radiation or the electron beams, and therefore hinder the thorough polymerization of the lacquer film, in particular with high concentrations of matting agents. The known matting lacquer layers can therefore exhibit a poor drying or polymerization behavior.

Frequently, polymerization-promoting additives, such as photoinitiators, are admixed to the lacquer to accelerate curing. These additives are frequently health hazards. It may also occur that the lacquer layers are cured only in part and that substances harmful to people's health are released from the areas that were not thoroughly cured.

In the known polymerization methods, it is necessary to produce a homogeneous distribution of the additives in the lacquer, in particular, the dispersed matting agents, before the application of the lacquer layers, and to maintain the matting agents on the substrate during the application of the lacquer film. It has become evident, however, that the matting agents are deposited during certain steps of the method upon application of the lacquer film. Thus, for example, upon applying colored lacquers by means of rollers on the substrate, the matting agents accumulate on the rollers, wherein lacquer layers may form with nonhomogeneous distribution of the matting agents.

SUMMARY OF THE INVENTION

The goal of the invention under consideration is therefore to indicate an object with a homogeneous matted surface and to make available a polymerization method for the production of the matting, which can be carried out in a simple manner and at low cost, and which makes a rapid and complete polymerization possible.

With regard to the object with the matted surface, this goal is attained in accordance with the invention in that the surface of the plastic layer is formed by a thin skin layer produced by polymerization of the organic material by means of UV radiation of a wavelength of at most 200 nm, which is formed on a carrier layer produced by the polymerization of the organic material with UV radiation of a wavelength of at least 220 nm, or by means of electron beams.

BRIEF DESCRIPTION OF THE PREFERRED EMBODIMENTS

In the area of the skin layer of the plastic layer, the organic material is completely or partially polymerized by the formation of a structured surface that appears optically mat. This surface polymerization takes place by the radiation of the organic material with a UV radiation of a wavelength of at most 200 nm. The shortwave UV radiation is absorbed within a thin area underneath the surface, which is designated here as the skin layer. The photon energy of the shortwave UV radiation thereby used is so high that the monomers of the organic material can absorb this radiation with bond breakage, wherein the radicals needed for the polymerization are produced. It is therefore not necessary that photoinitiators be added to the organic material. The organic material contracts as a result of the surface polymerization, shrinks somewhat thereby, and forms an uneven, structured surface. The structuring cannot be recognized as such with the naked eye. The concrete formation of the structuring determines the degree of matting of the surface. It is dependent on the reactivity of the organic material with regard to the UV radiation, the photon density (intensity) of this radiation, and the duration of the radiation. With a high reactivity or with a high photon density, and long radiation times, a dense network of structural elements is produced; with a low reactivity of the organic material or a low photon density, and short radiation times, a wide-meshed network is produced. The optimal parameters can be determined simply with the aid of a few polymerization experiments. The radiation times selected can be very short, for example, in the nanosecond range.

The skin layer is relatively thin. A thickness of a few monolayers is sufficient to produce the desired optical effect. The thicker the skin layer, the clearer will be the structuring of the surface. With very thick skin layers, for example, with a thickness of more than approximately 2 $\mu$m, the mat surface no longer has a smooth effect, which is frequently undesirable.

The carrier layer supports the skin layer. As is common in the state of the art, it is polymerized homogeneously by means of UV rays of a wavelength above 220 nm or by means of electron beams. The thickness of the carrier layer depends on the function of the plastic layer. As a protective layer, it [the carrier layer] has a relatively large thickness; as a pure supporting layer for the skin layer, it can also be formed very thin. However, in any case, it is thicker than the skin layer.

With the matted surface in accordance with the invention, matting agents are not required. With layers without matting agents, there is no danger of a nonhomogeneous distribution of such agents. The additional use of matting agents, however, is not ruled out as a possibility as long as they do not hinder the polymerization method, in accordance with the invention, to produce the matting.

The substrate can be, for example, paper, wood, ceramics, glass, or a polymer.

In a preferred specific embodiment of the invention, the skin layer and the carrier layer exhibit the same chemical composition. Such a layer, in which the skin layer and the carrier layer are not integrally connected with one another, is characterized by a particularly homogeneous matting.

Advantageously, the plastic layer is made up of only one single homogeneous phase. Matting agents are not dispersed therein, so that the danger of a nonhomogeneous distribution of such matting agents does not exist.

A particularly homogeneous matting is obtained with plastic layers in which the skin layer is produced by radiation with UV rays of a wavelength of 172 nm.

Acrylates or epoxides have proved effective as organic materials for the formation of the plastic layer. It is assumed that other unsaturated, polymerizable organic compounds are also suitable for the formation of the plastic layer.

With regard to the polymerization method, the aforementioned goal is attained, in accordance with the invention, that the method comprises the following steps:

application on the substrate of a film made of an organic material that can be polymerized by means of UV rays or electron beams;

irradiation of the film with UV radiation of a wavelength of at most 200 nm with the production of a thin skin layer close to the surface, in which the organic material is at least partially polymerized; and polymerization of the core area of the film placed beneath the skin layer by means of UV radiation of a wavelength of at least 220 nm or by means of electron beams with the production of a carrier layer of polymerized organic material.

In a first method step, a film of the polymerizable organic material is applied on a substrate in a known manner.

Subsequently, the surface of the film is polymerized by radiation with a UV radiation of a relatively short wavelength of at most 200 nm. The shortwave UV radiation is absorbed within a thin area beneath the surface which is designated here as the skin layer. The organic material contracts as a result of the surface polymerization and thereby forms an uneven, structured surface. This exhibits a structure of fine structural elements, as, for example, fine lines branched from one another, which produce an optically mat effect, but which cannot be recognized as such with the naked eye. The mat surface thus produced, therefore, has a completely smooth effect. The concrete formation of the structuring determines the degree of matting of the surface. It is dependent on the reactivity of the organic material with regard to UV radiation and the photon density (intensity) of said radiation. With a high reactivity or with high photon energy, a dense network of structural elements is produced; with a lower photon density, a wide-meshed network is produced.

The photon energy of the shortwave UV radiation thereby used is so high that the monomers of the organic material can absorb this radiation with bond breakage, wherein the radicals needed for the polymerization are produced. The addition of photoinitiators is therefore not necessary in the polymerization method in accordance with the invention.

Likewise, the use of matting agents is not necessary for the production of matting in the method according to the invention. The disadvantages connected with the addition of matting agents, such as nonhomogeneous distribution of the agents and poor drying behavior of the film, can thus be avoided. The use of matting agents is, however, not to be ruled out as a possibility with the method of the invention either, as long as they do not hinder the polymerization method of the invention to produce the matting.

With so-called "radical systems" in which the chain reaction of radicals leading to the polymerization is triggered, oxygen has an inhibiting effect. This effect of oxygen is based on the fact that it reacts with the radicals contained in the system and in this way captures them. The presence of oxygen therefore slows down the polymerization. In the skin layer, the organic material is polymerized at least partially. The skin produced on the film in this way exhibits a higher density than the core area of the film which is underneath and is still not polymerized, and it thus hinders the diffusion of oxygen into the interior of the film.

The term "core area" is understood to mean the area of the film which is not polymerized by the shortwave UV radiation and which usually takes up the largest part of the volume of the film.

In another step of the method, this core area of the film lying under the skin layer is thoroughly polymerized by UV radiation of a longer wavelength of at least 220 nm or by means of electron beams. A very rapid polymerization of the organic material in the core area can be attained because the incorporation of the oxygen into the core area of the layer is hindered by the skin layer.

Usually the core area is polymerized after the formation of the skin layer. The production of the skin layer can, however, also take place simultaneously with the polymerization of the core area.

In a preferred procedure, irradiation is carried out with essentially monochromatic UV radiation of a wavelength around 172 nm to produce the skin layer of the film. UV radiation of this wavelength is absorbed well in most organic materials suitable for the formation of the film, wherein the radicals needed for the polymerization are produced. The addition of photoinitiators is therefore not necessary. It became evident that UV radiation of this wavelength produces a homogeneous skin layer within a very short time span. As a result of the monochromasy [sic; monochromaticity], secondary radiation from areas with unsuitable wavelengths, in particular, longwave infrared rays, which would lead to a heating of the substrate or the film, is avoided. Either the gap between the radiation source and the film should be made inert, that is, it should be rinsed with inert gas, or the interval between the radiation source and the film should be made as small as possible, because of the absorption of the shortwave radiation in air.

It has proved particularly advantageous to use incoherent UV radiation of an excimer radiator for the production of the skin layer. The excimer radiator permits an irradiation of large surfaces. A scanning of the surface or an optical-ray widening, as would, for example, be required with a coherent laser beam, is thereby omitted.

One method, in which an acrylate-containing or an epoxide-containing material is used as an organic material, has proved particularly advantageous. It is assumed that the polymerization method also succeeds with other unsaturated, polymerizable organic compounds.

A procedure in which the polymerization of the core area takes place after the production of the skin layer is preferred. The method can be operated continuously or discontinuously.

BRIEF DESCRIPTION OF THE DRAWINGS

An exemplified embodiment of the invention will be explained in more detail below with the aid of the patent drawing. The drawing shows, in schematic representation and in detail, the following.

* [Editor's note: Figures not included with document.]

Figure 2A:
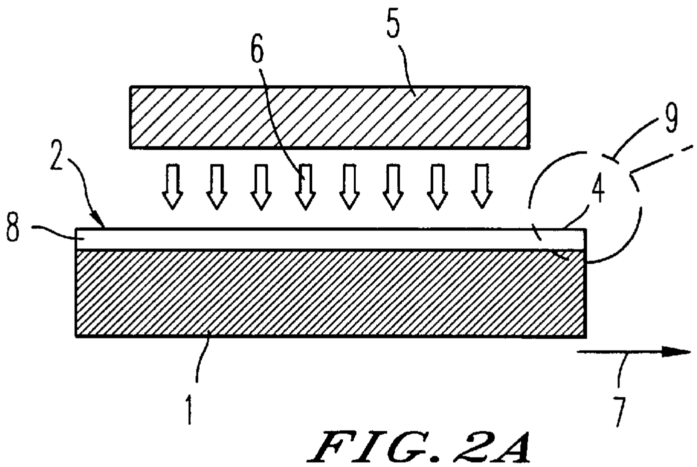
Figure 2B:
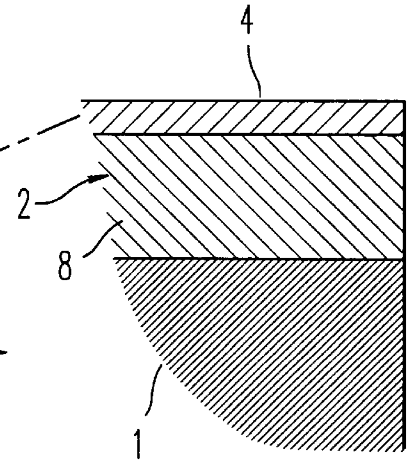
Figure 3A:
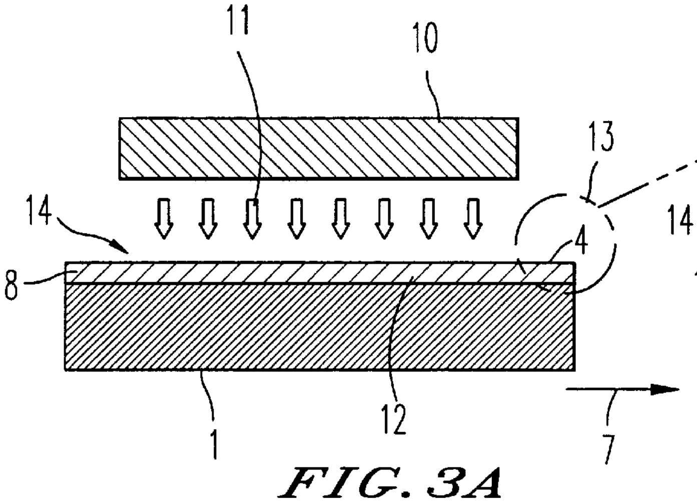
Figure 3B:
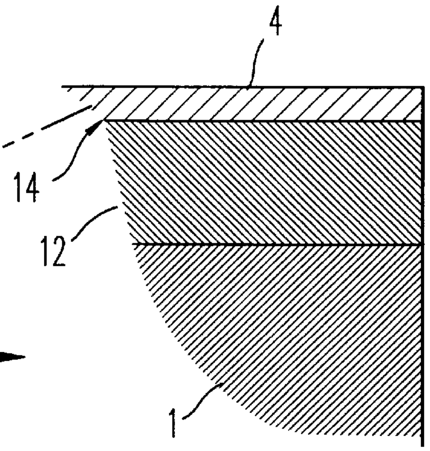

FIG. 2a, FIG. 2b, the production of the skin layer on the film, using an excimer radiator, or a section enlargement thereof; and FIG. 3a, FIG. 3b, the thorough polymerization of the film, using a UV lamp, or a section enlargement thereof.

Figure 1A:
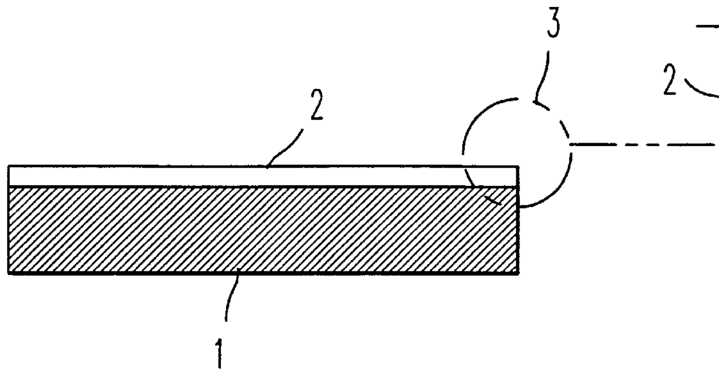
FIG. 1a*, FIG. 1b show a substrate with a film made of a polymerizable organic material, or a section enlargement thereof, applied on the substrate.
Figure 1B:
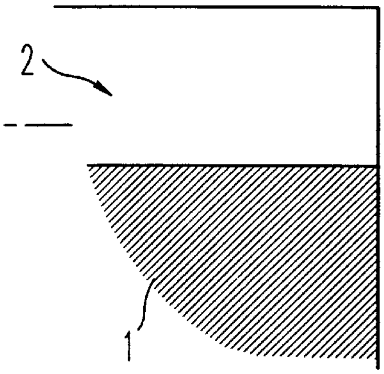

In all figures, 1 represents a paper sheeting. FIG. 1*a* and 1*b* show, in schematic representation, the paper sheeting 1, on which a film 2 made of acrylate that can be polymerized by means of UV radiation is applied with a thickness of approximately 5 μm.

One can see from the enlargement of section 3 in FIG. 1*b* that film 2 is homogeneous and dispersed matting agents are not contained therein.

Film 2 is surface-polymerized with the production of a skin layer 4 in the step shown schematically in FIG. 2*a*. The skin layer 4 exhibits a thickness of only a few monolayers. The thickness ratios between the skin layer 4 and the film 2, as a whole, are not represented true to scale because of reasons of clarity. The film 2 is irradiated with a xenon excimer radiator 5 to produce the skin layer 4. The xenon excimer radiator 5 produces shortwave UV rays of a wavelength of 172 nm, which are marked schematically with the direction arrows 6. This shortwave, energy-rich UV radiation 6 is very rapidly absorbed in the film 2, so that the radicals needed for the polymerization are produced in the acrylate film 2. Photoinitiators are not required and not contained. There are shrinkage phenomena in the area of the free surface of the film 2 which are designated here as the skin layer 4, because of the polymerization that takes place close to the surface. The shrinkage phenomena produce a fine structuring of the surface of the film 2 in the form of finely branched lines, which make the surface appear optically mat. The xenon excimer radiator 5 is designed in the form of a tubular, circular radiator. It has a length of 30 cm and an outside diameter of 3 cm and is supplied with an electrical power of 25 W/cm. The time of the irradiation is 10 ms in this exemplified embodiment.

The irradiation with the shortwave radiation 6 takes place continuously in the exemplified embodiment, wherein the paper sheeting 1 is moved through within the xenon excimer radiator 5 in the direction of the direction arrow 7.

From the schematic representation in accordance with FIG. 2*b*, one can see that after the irradiation with the xenon excimer radiator 5, the surface of the film 2 is polymerized with the formation of the skin layer 4. The core area 8 of the film 2, lying underneath, is not yet polymerized because of the short penetration depth of the shortwave UV radiation 6. In this stage of the method, the skin layer 4 forms a diffusion barrier to gases, in particular, for oxygen, so that the subsequent curing of the core area 8, as it is schematically shown in FIG. 3*a*, is not hindered by the influence of oxygen.

In FIG. 3*a*, the symbol 10 is assigned to an XeCl excimer radiator which generates UV radiation 11 of a wavelength of approximately 308 nm. The core area 8 of the film 2 is cured by UV radiation 11, with the production of a polymerized carrier layer 12. The carrier layer 12 thereby serves as a support for the thin skin layer 4. In the exemplified embodiment, the XeCl excimer radiator 10, which is also designed as a tubular, circular radiator, has a length of 100 cm and an outside diameter of 3 cm. It is supplied with an electric power of 50 W/cm. The curing time is approximately 100 nsec.

In the exemplified embodiment, the curing of the core area 8 of the layer 2 takes place after the production of the skin layer 4 in that the XeCl excimer radiator 10, seen in the movement direction 7 of the paper sheeting 1, is placed after the xenon excimer radiator 5.

The final polymerized acrylate plastic layer is represented in the enlargement of section 13 in FIG. 3*b* and, as a whole, designated with the symbol 14. The densities of the skin layer 4 and carrier layer 12 hardly differ in this procedure.

The polymerization of the core area 8 for the production of the carrier layer 12 can take place by means of any common method, for example, also by means of a KrCl excimer radiator, an Hg medium-pressure radiator, or by means of electron beams.

What is claimed as new and desired to be secured by Letters Patent of the United States is:

1. A polymerization method for the production of a matted surface on a substrate, which consists essentially of the following steps:

application of a film made of an organic material on the substrate;

irradiation of the film with UV radiation of a wavelength of at most 200 nm, with the production of a thin skin layer, at the surface and in which the organic material is at least partially polymerized; and polymerization of a core area of the film, placed underneath the skin layer, by means of UV radiation of a wavelength of at least 220 nm or by means of electron beams, with the production of a carrier layer made of polymerized organic material, wherein the thin skin layer is polymerized before the core area is polymerized.

2. The polymerization method according to claim 1, characterized by the fact that for the production of the skin layer, the film is irradiated with essentially monochromatic UV radiation of a wavelength around 172 nm.

3. the polymerization method according to claim 1, characterized by the fact that incoherent UV radiation of an excimer radiator is used for the production of the skin layer.

4. The polymerization method according to one of claim 1, characterized by the fact that an acrylate-containing or an epoxide-containing material is used as an organic material.

5. An object having an optically matte surface, comprising:

a substrate; and an optically matte surface layer on the substrate; wherein the optically matte surface layer is made by the process as claimed in claim 1; and wherein the optically matte surface layer does not contain any matting agents.

6. The object according to claim 5, characterized by the fact that the skin layer and the carrier layer have the same chemical composition.

7. The object according to claims 5, characterized by the fact that the skin layer and the carrier layer consist of a single homogenous phase.

8. The object according to claim 5, characterized by the fact that the skin layer is produced by irradiation with UV radiation of a wavelength of 172 nm.

9. The object according to claim 5, characterized by the fact that the skin layer has a thickness in the range of 1–50 nm.

10. The object according to claim 5, characterized by the fact that the optically mable surface layer contains an acrylate, or an epoxide.

* * * * *